US012741631B2

(12) United States Patent
Song

(10) Patent No.: US 12,741,631 B2
(45) Date of Patent: Sep. 22, 2026

(54) VEHICLE CONTROL APPARATUS AND METHOD THEREOF

(71) Applicants: HYUNDAI MOTOR COMPANY, Seoul (KR); KIA CORPORATION, Seoul (KR)

(72) Inventor: Min Seok Song, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 71 days.

(21) Appl. No.: 18/815,605

(22) Filed: Aug. 26, 2024

(65) Prior Publication Data

US 2025/0276681 A1 Sep. 4, 2025

(30) Foreign Application Priority Data

Feb. 29, 2024 (KR) ........................ 10-2024-0029994

(51) Int. Cl.
*B60W 20/15* (2016.01)
*B60L 15/20* (2006.01)
*B60W 50/00* (2006.01)

(52) U.S. Cl.
CPC ............. *B60W 20/15* (2016.01); *B60L 15/20* (2013.01); *B60W 50/0097* (2013.01); (Continued)

(58) Field of Classification Search
CPC ............. B60W 20/15; B60W 50/0097; B60W 2510/1015; B60W 2510/1025; B60W 2510/244; B60W 2520/10; B60W 2530/00; B60W 2552/15; B60W 2530/10; B60W 10/08; B60W 20/11; B60W 40/13; B60W 20/00; B60W 2050/0028; B60W 2510/0638; B60W 2510/0657; B60W 2510/08; B60L 15/20; B60L 2240/12; B60L 2240/54; B60L 2240/642; B60L 15/2045; B60Y 2200/92; Y02T 10/62
See application file for complete search history.

(56) References Cited

U.S. PATENT DOCUMENTS 10,408,668 B2 9/2019 Park
2018/0128672 A1 5/2018 Park
(Continued)

FOREIGN PATENT DOCUMENTS

KR 101836290 B1 4/2018

*Primary Examiner* — Bao Long T Nguyen
(74) *Attorney, Agent, or Firm* — Lempia Summerfield Katz LLC

(57) ABSTRACT

A vehicle control apparatus includes a processor configured to obtain operation data including at least one of a required power value of a vehicle, a speed of the vehicle, transmission efficiency, or a gradient angle. The processor is also configured to calculate total mass of the vehicle, including at least one of tolerance mass of the vehicle, mass of a passenger riding in the vehicle, mass of an object loaded into the vehicle, or mass of fuel of the vehicle. The processor is further configured to calculate predicted data including at least one of a ratio of a time when the vehicle travels in an HEV mode to a total driving time of the vehicle, an SOC of a battery of the vehicle, or a load on a road in front of the vehicle. The processor is additionally configured to control the vehicle based on the predicted data.

18 Claims, 10 Drawing Sheets

(52) U.S. Cl.
CPC ....... *B60L 2240/12* (2013.01); *B60L 2240/54* (2013.01); *B60L 2240/642* (2013.01); *B60W 2510/1015* (2013.01); *B60W 2510/1025* (2013.01); *B60W 2510/244* (2013.01); *B60W 2520/10* (2013.01); *B60W 2530/00* (2013.01); *B60W 2552/15* (2020.02)

(56) References Cited

U.S. PATENT DOCUMENTS

2018/0194357 A1* 7/2018 Hall ....................... B60K 35/28
2019/0217847 A1* 7/2019 Hawley ........... B60W 30/18109

* cited by examiner

| Torque \ RPM | 1000 | 1500 | 2000 | 2500 |
|---|---|---|---|---|
| 40 | 88.3 | 88.4 | 88.5 | 88.6 |
| 50 | 89.0 | 89.2 | 89.4 | 89.5 |
| 60 | 89.5 | 89.8 | 90.0 | 90.2 |
| 70 | 89.8 | 90.2 | 90.4 | 90.5 |
| 80 | 89.9 | 90.5 | 90.6 | 90.8 |
| 90 | 90.1 | 90.8 | 90.9 | 91.1 |
| 100 | 90.0 | 90.7 | 90.9 | 91.2 |

FIG.7

VEHICLE CONTROL APPARATUS AND METHOD THEREOF

CROSS-REFERENCE TO RELATED APPLICATION

This application claims the benefit of and priority to Korean Patent Application No. 10-2024-0029994, filed on Feb. 29, 2024, the entire contents of which are hereby incorporated herein by reference.

TECHNICAL FIELD

The present disclosure relates to a vehicle control apparatus and a method thereof, and more particularly, relates to technologies for calculating total mass of a vehicle and controlling the vehicle.

BACKGROUND

Recently, as electric vehicles and hybrid electric vehicles have become more popular, it has become important to predict data for controlling the electric vehicles or the hybrid electric vehicles or managing batteries.

For example, predicting the power of the vehicle plays an important role in improving efficient driving, the use of the battery, the life management of the battery, or the efficiency of a power infrastructure.

In detail, a driving load acting on the electric vehicle or the hybrid electric vehicle may be predicted to improve the fuel economy (or fuel efficiency) of the vehicle. As total mass of the vehicle is more accurately calculated, the vehicle may be efficiently controlled.

The driving load acting on the vehicle may be composed of rolling resistance, air resistance, acceleration resistance, and gradient resistance.

Particularly, the gradient resistance is greatly affected by the total mass of the vehicle. The total mass of the vehicle may vary depending on the luggage loaded on the vehicle, the number of passengers, driving habits, or the like. In this case, if the total mass of the vehicle is dependent on a parameter, it is difficult to reflect energy flow.

SUMMARY

The present disclosure has been made to solve the above-mentioned problems occurring in the prior art while advantages achieved by the prior art are maintained intact.

An aspect of the present disclosure provides a vehicle control apparatus for improving the accuracy of calculating total mass of a vehicle traveling, by means of a data trend line based on operation data, and a method thereof.

Another aspect of the present disclosure provides a vehicle control apparatus for improving the accuracy of predicting a driving load using the calculated total mass of the vehicle and a method thereof.

Another aspect of the present disclosure provides a vehicle control apparatus for efficiently managing a state of charge (SOC) of a battery, based on a driving load predicted using total mass of a vehicle, and a method thereof.

Another aspect of the present disclosure provides a vehicle control apparatus for efficiently controlling a vehicle, based on a driving load predicted using total mass of the vehicle, and a method thereof.

The technical problems to be solved by the present disclosure are not limited to the aforementioned problems. Other technical problems not mentioned herein should be more clearly understood from the following description by those having ordinary skill in the art to which the present disclosure pertains.

According to an aspect of the present disclosure, a vehicle control apparatus is provided. The vehicle control apparatus includes a memory storing a program instruction and a processor that executes the program instruction. The processor is configured to obtain operation data including at least one of a required power value of a vehicle, a speed of the vehicle, transmission efficiency, a gradient angle, or any combination thereof, in a state in which a change in the speed of the vehicle is maintained within an error range. The processor is also configured to calculate total mass of the vehicle, the total mass including at least one of tolerance mass of the vehicle, mass of a passenger who rides in the vehicle, mass of an object loaded into the vehicle, mass of fuel of the vehicle, or any combination thereof, based on the operation data. The processor is additionally configured to calculate predicted data including at least one of a ratio of a time when the vehicle travels in a hybrid electric vehicle (HEV) mode to a total driving time of the vehicle, a state of charge (SOC) of a battery of the vehicle, a load on a road in front of the vehicle, or any combination thereof, based on the calculated total mass of the vehicle or predetermined default mass. The processor is further configured to control the vehicle based on the predicted data.

In an embodiment, the processor may be configured to derive a data trend line, based on the operation data. The processor may also be configured to calculate a slope value of the data trend line. The processor may be additionally configured to calculate the total mass of the vehicle, based on at least one of the slope value of the data trend line, the transmission efficiency, or any combination thereof.

In an embodiment, the processor may be configured to calculate the predicted data based on the predetermined default mass when the processor is unable to derive a data trend line based on the operation data.

In an embodiment, the processor may be configured to obtain the transmission efficiency, based on map data including a transmission efficiency value determined according to revolutions per minute (RPM) of the vehicle and input torque of the vehicle.

In an embodiment, the processor may be configured to calculate the total mass of the vehicle based on only the operation data obtained in a state in which the vehicle is driven by a motor.

In an embodiment, the processor may be configured to calculate the total mass of the vehicle based on only the operation data obtained in a state in which the vehicle does not proceed with shift.

In an embodiment, the processor may be configured to calculate the total mass of the vehicle based on only the operation data obtained in a mode in which the vehicle automatically travels depending on a distance from a preceding vehicle and a predetermined speed.

In an embodiment, the processor may be configured to identify mass data of the vehicle, the mass data including the calculated total mass of the vehicle or the predetermined default mass, and calculate the ratio of the time when the vehicle travels in the HEV mode to the total driving time of the vehicle, based on a first layer model including a dynamic programming model and associated with global path planning and the mass data of the vehicle. In an embodiment, the processor may be configured to calculate at least one of the SOC of the battery of the vehicle, the load on the road in front of the vehicle, or any combination thereof, based on a second layer model including at least one of an acceleration prediction model, a vehicle required power model, a vehicle control model, or any combination thereof and associated with local path planning and the mass data of the vehicle.

In an embodiment, the processor may be configured to derive the data trend line using a linear least square (LSQ).

In an embodiment, the processor may be configured to control the vehicle in an electric vehicle (EV) mode based on the predicted data, or control the vehicle in the hybrid electric vehicle (HEV) mode based on the predicted data.

According to another aspect of the present disclosure, a vehicle control method is provided. The vehicle control method includes obtaining, by a processor, operation data including at least one of a required power value of a vehicle, a speed of the vehicle, transmission efficiency, a gradient angle, or any combination thereof, in a state in which a change in the speed of the vehicle is maintained within an error range. The vehicle control method also includes calculating, by the processor, total mass of the vehicle including at least one of tolerance mass of the vehicle, mass of a passenger who rides in the vehicle, mass of an object loaded into the vehicle, mass of fuel of the vehicle, or any combination thereof, based on the operation data. The vehicle control method further includes calculating, by the processor, predicted data including at least one of a ratio of a time when the vehicle travels in a hybrid electric vehicle (HEV) mode to a total driving time of the vehicle, a state of charge (SOC) of a battery of the vehicle, a load on a road in front of the vehicle, or any combination thereof, based on the calculated total mass of the vehicle or predetermined default mass. The vehicle control method additionally includes controlling, by the processor, the vehicle, based on the predicted data.

According to an embodiment, calculating the total mass of the vehicle may include deriving, by the processor, a data trend line based on the operation data. Calculating the total mass of the vehicle may also include calculating, by the processor, a slope value of the data trend line. calculating the total mass of the vehicle may additionally include calculating, by the processor, the total mass of the vehicle, based on at least one of the slope value of the data trend line, the transmission efficiency, or any combination thereof.

According to an embodiment, calculating the predicted data may include calculating, by the processor, the predicted data based on the predetermined default mass when the processor is unable to derive a data trend line based on the operation data.

According to an embodiment, obtaining the operation data may include obtaining, by the processor, the transmission efficiency based on map data including a transmission efficiency value determined according to revolutions per minute (RPM) of the vehicle and input torque of the vehicle.

According to an embodiment, calculating the total mass of the vehicle may include calculating, by the processor, the total mass of the vehicle based on only the operation data obtained in a state in which the vehicle is driven by a motor.

According to an embodiment, calculating the total mass of the vehicle may include calculating, by the processor, the total mass of the vehicle based on only the operation data obtained in a state in which the vehicle does not proceed with shift.

According to an embodiment, calculating the total mass of the vehicle may include calculating, by the processor, the total mass of the vehicle based on only the operation data obtained in a mode in which the vehicle automatically travels depending on a distance from a preceding vehicle and a predetermined speed.

According to an embodiment, calculating the predicted data may include identifying, by the processor, mass data of the vehicle, the mass data including the calculated total mass of the vehicle or the predetermined default mass. Calculating the predicted data may also include calculating, by the processor, the ratio of the time when the vehicle travels in the HEV mode to the total driving time of the vehicle, based on a first layer model including a dynamic programming model and associated with global path planning and the mass data of the vehicle. According to an embodiment, calculating the predicted data may include identifying, by the processor, the mass data of the vehicle, the mass data including the calculated total mass of the vehicle or the predetermined default mass. Calculating the predicted data may also include calculating, by the processor, at least one of the SOC of the battery of the vehicle, the load on the road in front of the vehicle, or any combination thereof, based on a second layer model including at least one of an acceleration prediction model, a vehicle required power model, a vehicle control model, or any combination thereof and associated with local path planning and the mass data of the vehicle.

According to an embodiment, deriving the data trend line based on the operation data by the processor may include deriving, by the processor, the data trend using a line using a linear least square (LSQ).

According to an embodiment, controlling the vehicle based on the predicted signal may include controlling, by the processor, the vehicle in an electric vehicle (EV) mode based on the predicted data, or controlling, by the processor, the vehicle in the hybrid electric vehicle (HEV) mode based on the predicted data.

BRIEF DESCRIPTION OF THE DRAWINGS

The above and other objects, features and advantages of the present disclosure should be more apparent from the following detailed description taken in conjunction with the accompanying drawings, in which:

FIG. 7 is a drawing illustrating an example of map data of transmission efficiency used to calculate total mass of a vehicle, in a vehicle control apparatus according to an embodiment of the present disclosure;

DETAILED DESCRIPTION

Hereinafter, embodiments of the present disclosure are described in detail with reference to the accompanying drawings. In the accompanying drawings, the identical components are designated by the identical numerals even when the components are displayed on different drawings. In addition, where it was determined that a detailed description of well-known features or functions may obscure the gist of the present disclosure, the detained description thereof has been.

In describing components of embodiments of the present disclosure, the terms first, second, A, B, (a), (b), and the like may be used herein. These terms are only used to distinguish one component from another component. The terms do not limit the corresponding components irrespective of the order or priority of the corresponding components. The expression "at least one of A, B, or C, or any combination thereof" may include "A", "B", or "C", or "AB", "BC", "AC", or "ABC", which is a combination thereof.

Furthermore, unless otherwise defined, all terms including technical and scientific terms used herein have the same meaning as generally understood by those having ordinary skill in the art to which the present disclosure pertains. Such terms as those defined in a generally used dictionary should be interpreted as having meanings equal to the contextual meanings in the relevant field of art, and should not be interpreted as having ideal or excessively formal meanings unless clearly defined as having such in the present disclosure.

When a component, device, element, or the like of the present disclosure is described as having a purpose or performing an operation, function, or the like, the component, device, or element should be considered herein as being "configured to" meet that purpose or perform that operation or function.

Hereinafter, embodiments of the present disclosure are described in detail with reference to FIGS. 1-10.

Figure 1:
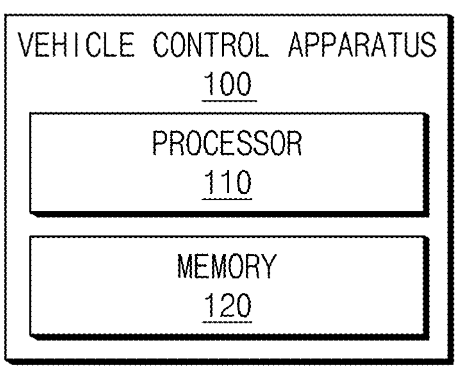
FIG. 1 is a block diagram illustrating a vehicle control apparatus, according to an embodiment of the present disclosure.

FIG. 1 is a block diagram illustrating a vehicle control apparatus, according to an embodiment of the present disclosure.

According to an embodiment, a vehicle control apparatus 100 may include a processor 110 and a memory 120. The components of the vehicle control apparatus 100 that are shown in FIG. 1 are illustrative, and embodiments of the present disclosure are not limited thereto. For example, the vehicle control apparatus 100 may further include components that are not shown in FIG. 1.

According to an embodiment, the memory 120 may store a command and/or data. For example, the memory 120 may store one instruction or two or more instructions that, when executed by the processor 110, cause the vehicle control apparatus 100 to perform various operations.

According to an embodiment, the memory 120 and the processor 110 may be implemented as one chipset and may store various pieces of information associated with the vehicle control apparatus 100. For example, the memory 120 may store information about an operation history of the processor 110.

According to an embodiment, the memory 120 may include a non-volatile memory (e.g., a read only memory (ROM)) and/or a volatile memory (e.g., a random access memory (RAM)). For example, operation data including a required power value of a vehicle, a speed of the vehicle, transmission efficiency, and a gradient angle may be stored in the memory 120.

According to an embodiment, the vehicle associated with the vehicle control apparatus 100 may be a hybrid electric vehicle (HEV). The HEV may include an engine, a motor, an engine clutch for selectively connecting the engine and the motor, a transmission, a differential gear device, and/or a battery. Furthermore, the HEV may include a hybrid starter & generator (HSG) for starting the engine or being generated by an output of the engine. The HSG may be referred to as an integrated starter & generator (ISG).

According to an embodiment, the vehicle control apparatus 100 may control the vehicle, based on a control mode including at least one of an electric vehicle (EV) mode using power of the motor, an engine mode using power of the engine, an HEV mode for using power of the motor as auxiliary power while using power of the engine as main power, a regenerative braking mode for collecting braking and inertial energy by means of the generation of the motor upon driving (or operation) due to braking and inertial of the vehicle, or any combination thereof.

According to an embodiment, the processor 110 may obtain operation data including at least one of a required power value of the vehicle, a speed of the vehicle, transmission efficiency, a gradient angle, or any combination thereof, in a state in which a change in the speed of the vehicle is maintained within an error range.

According to an embodiment, the state in which the change in the speed of the vehicle is maintained within the error range may include a state in which the vehicle travels at a constant speed during a specific time or more. For example, the state in which the change in the speed of the vehicle is maintained within the error range may include a state in which the vehicle travels in a state in which its acceleration is "0".

In an example, the specific time may include a time to determine that the vehicle maintains the constant speed. The error range may be set to a range in which it is able be determined that the speed of the vehicle is constant.

As a detailed example, if the change in the speed of the vehicle is maintained for 10 seconds or more within an error range set to 1 km/h, the processor 110 may determine a state in which the change in the speed of the vehicle is maintained within the error range.

As another example, the state in which the change in the speed of the vehicle is maintained within the error range may include a state in which the vehicle travels in a mode where the vehicle automatically travels at a predetermine speed. In detail, the state in which the change in the speed of the vehicle is maintained within the error range may include a state in which a function of keeping the predetermined speed constant is used to drive the vehicle even if a driver does not press the accelerator pedal. Accordingly, the vehicle may automatically travel while maintaining a certain distance from a preceding vehicle. As a more detailed example, the function may include a cruise control function, a smart cruise control function, or an adaptive cruise control function.

According to an embodiment, the processor 110 may obtain operation data including at least one of a required power value of the vehicle, a speed of the vehicle, transmission efficiency, a gradient angle, or any combination thereof.

According to an embodiment, the operation data may be obtained by means of a sensor of the vehicle.

According to an embodiment, the sensor may include one or more sensors. For example, the sensors may be attached at different locations on the vehicle. The sensors may face one or more different directions. For example, the sensors may be attached to the front, sides, rear, or roof of the vehicle to face various directions, such as forward-facing, rear-facing, and side-facing.

In an embodiment, the sensors may include an image sensor such as a high dynamic range camera. As another example, the sensors may include a non-visual sensor. For example, the sensors may include radio detection and ranging (RADAR), light detection and ranging (LiDAR), or an ultrasonic sensor, in addition to, or instead of, the image sensor.

In an embodiment, the sensors may include a yaw sensor, a roll sensor, a pitch sensor, a collision sensor, a wheel sensor, a speed sensor, a tilt sensor, a weight sensor, a heading sensor, a gyro sensor, a position module, a moving object forward/backward sensor, a battery sensor, a fuel sensor, a tire sensor, a steering sensor according to steering wheel rotation, a moving object internal temperature sensor, a moving object internal humidity sensor, an ultrasonic sensor, an illumination sensor, an accelerator pedal position sensor, and/or a brake pedal position sensor.

For example, the vehicle control apparatus 100 may obtain sensing data for moving object posture information, moving object collision information, moving object direction information, moving object position information (or GPS information), moving object angle information, moving object speed information, moving object acceleration information, moving object tilt information, moving object forward/backward information, battery information, fuel information, tire information, moving object lamp information, moving object internal temperature information, moving object internal humidity information, a steering wheel rotation angle, moving object external illumination, pressure applied to the accelerator pedal, and/or pressure applied to the brake pedal, by means of the sensor.

According to an embodiment, the required power value of the vehicle may include a power value necessary to operate the vehicle. For example, the required power value of the vehicle may include an output necessary for the vehicle to travel at a specific speed or specific torque.

According to an embodiment, the transmission efficiency may be obtained based on map data for a transmission efficiency value. For example, the map data for the transmission efficiency value may include shift efficiency values determined according shift revolutions per minute (RPM) of the vehicle and input torque of the vehicle. The input torque of the vehicle may include transmission input torque. The transmission efficiency may be replaced with a shift efficiency value included in the map data for the shift efficiency value.

According to an embodiment, the gradient angle may include an angle of a slope at which the vehicle is able to travel. The greater the gradient angle, the greater the required power of the vehicle may be. The gradient angle may be represented in units of degree or %. The gradient angle may be obtained by the several sensors described above.

For example, a gradient of the road may be displayed in units of %. As a detailed example, the altitude may be increased by 10 m for every 100 m of horizontal distance if the gradient is 10%, and the altitude may be increased by 20 m for every 100 m of horizontal distance if the gradient is 20%.

In an example, the gradient of the road that is displayed in units of % may be converted into degree. For example, if the gradient is 100%, it may be converted into a gradient of 45 degrees.

According to an embodiment, the processor 110 may store the obtained operation data in the memory 120.

According to an embodiment, the processor 110 may calculate total mass of the vehicle based on the operation data. For example, the total mass of the vehicle may include at least one of tolerance mass of the vehicle, mass of a passenger who rides in the vehicle, mass of an object loaded into the vehicle, mass of fuel of the vehicle, or any combination thereof. For example, the total mass of the vehicle may fluctuate due to a driving environment of the vehicle or driving habits of the driver.

According to an embodiment, the processor 110 may derive a data trend line based on the operation data to calculate the total mass of the vehicle. The data trend line may include a line visually showing a trend or tendency in data.

According to an embodiment, the processor 110 may derive a data trend line of the operation data using a linear least square (LSQ). The LSQ may include a method for approximating a solution equation of a certain system. For example, the LSQ may include a method for obtaining a solution in which the sum of squares of an error between the approximated solution and an actual solution is minimized.

For example, the LSQ may be understood as a method for minimizing an error between data and a trend line and finding an optimal line. The trend line may be derived as a straight line in which the sum of squares of (a measured value–a function value) is minimized, for example.

According to an embodiment, the processor 110 may calculate a slope value of the derived data trend line.

For example, the processor 110 may calculate the slope value of the data trend line based on the total mass of the vehicle, gravitational acceleration, or the transmission efficiency.

According to an embodiment, the processor 110 may calculate the slope value of the data trend line with reference to Equations 1-3 below.

$$P = \left(\left(m\times a + f_0 + f_1\times v + f_2\times v^2 + m\times g\times \sin(\theta)\right)\times v\right)/E \quad \text{[Equation 1]}$$

In Equation 1, P may refer to the transmission input power, m may refer to the total mass of the vehicle, $f_0$, $f_1$, and $f_2$ may refer to the vehicle driving resistance coefficient values associated with the vehicle speed, respectively, v may refer to the speed of the vehicle, g may refer to the gravitational acceleration, θ may refer to the gradient angle, and E may refer to the transmission efficiency.

In detail, $f_0$ may refer to the load coefficient value regardless of the vehicle speed, $f_1$ may refer to the load coefficient value multiplied by the vehicle speed, and $f_2$ may refer to the load coefficient value multiplied by the square value of the vehicle speed.

$$\frac{P}{v} = \frac{m\times g}{E}\times \sin(\theta) + b \quad \text{[Equation 2]}$$

According to an embodiment, Equation 2 corresponds to the formula to which Equation 1 above is converted. For example, b may include values about $f_0$, $f_1$, and $f_2$.

According to an embodiment, Equation 2 may be represented as a function formula of Y=A×X+B. For example, the function formula may refer to a function formula for the trend line. In this case, the slope A of the function formula may be represented as Equation 3 below.

$$A = \frac{m \times g}{E} \quad \text{[Equation 3]}$$

According to an embodiment, Equation 3 may refer to a slope if Equation 2 above is represented as a primary function formula. Thus, the slope A of the trend line may be derived by the total mass m of the vehicle, the transmission efficiency E, and the gravitational acceleration g.

According to an embodiment, the processor 110 may calculate total mass of the vehicle, based on the slope value of the data trend line or the transmission efficiency, or any combination thereof.

According to an embodiment, the processor 110 may invert the total mass m of the vehicle by means of Equation 3 above. For example, Equation 3 above may be organized as m=(A×E)/g. The processor 110 may calculate the total mass m of the vehicle based on the formula of m=(A×E)/g.

According to an embodiment, the processor 110 may calculate predicted data, based on the calculated total mass of the vehicle or predetermined default mass.

According to an embodiment, the predicted data may include at least one of a ratio of a time when the vehicle travels in a hybrid electric mode (HEV) mode to a total driving time of the vehicle, a state of charge (SOC) of a battery of the vehicle, a load on a road in front of the vehicle, or any combination thereof. This is merely an example. The predicted data may further include various pieces of data necessary for the vehicle to travel on the road in front of the vehicle.

According to an embodiment, the ratio of the time when the vehicle travels in the HEV mode to the total driving time of the vehicle may include ratio information between a transit time taken for the vehicle to pass through each of a plurality of partial routes and a driving time when the vehicle travels in the HEV model along each of the plurality of partial routes.

According to an embodiment, the SOC of the battery of the vehicle may refer to the state of charge of the battery of the vehicle. For example, the SOC of the battery of the vehicle may refer to an index indicating a remaining capacity of the battery of the vehicle. The index may be determined by dividing the capacity of the battery that is currently available by a total capacity to represent a percentage (%).

According to an embodiment, the load on the road in front of the vehicle may include running resistance the vehicle is able to receive while traveling the road in front of the vehicle. The running resistance may include a force acting on the side which interferes with the driving of the vehicle.

For example, the running resistance may include rolling resistance generated while the wheels of the vehicle roll on a horizontal road surface, air resistance received from ambient air while the vehicle is traveling, gradient resistance generated as the vehicle travels on a slope, and/or acceleration resistance due to an inertial force to keep the vehicle stopped or at a slow speed.

According to an embodiment, the processor 110 may control the vehicle based on the predicted data. For example, the processor 110 may control the vehicle using the predicted data including the ratio of the time when the vehicle drives in the HEV mode to the total driving time of the vehicle, the SOC of the battery of the vehicle, and/or the load on the road in front of the vehicle.

According to an embodiment, the processor 110 may control the vehicle in an electric vehicle (EV) mode based on the predicted data, or may control the vehicle in the hybrid electric vehicle (HEV) mode based on the predicted data. For example, the processor 110 may control the vehicle using the predicted data, thus driving the vehicle with optimal fuel efficiency or fuel economy.

According to an embodiment, if the processor 110 is unable to derive the data trend line based on the operation data, the processor 110 may calculate predicted data based on the predetermined default mass. The default mass may include a mass value set regardless of a driving environment of the vehicle or driving habits of the driver. For example, the default mass may be set by a system or a user. As a detailed example, the default mass may be set to tolerance mass of the vehicle.

According to an embodiment, if the number of pieces of driving data is not enough for the processor 110 to be able to derive the data trend line, the processor 110 may calculate the predicted data based on the predetermined default mass.

According to an embodiment, the processor 110 may calculate total mass of the vehicle based on only operation data obtained in a state in which a specific condition is met.

According to an embodiment, the processor 110 may calculate total mass of the vehicle based on only operation data obtained in a state in which the vehicle is driven by only the motor. For example, the processor 110 may calculate total mass of the vehicle based on only operation data obtained in a state in which the vehicle drives in the EV mode.

According to an embodiment, the accuracy of torque in the motor in a drivetrain of the vehicle may be greater than that in the engine. Thus, the processor 110 may calculate total mass of the vehicle based on only operation data obtained in a state in which the vehicle is driven by only the motor with great accuracy of torque. As a detailed example, only transmission input power obtained in a state in which the vehicle is driven by only the motor may be used to calculate total mass of the vehicle.

According to an embodiment, the processor 110 may calculate total mass of the vehicle based on only operation data obtained in a state in which the vehicle does not proceed with shift. For example, the processor 110 may calculate total mass of the vehicle based on excluding operation data obtained while the vehicle is shifting and only operation data obtained in a state in which the shift is completed, thus increasing accuracy in which the processor 110 calculates the total mass of the vehicle.

According to an embodiment, the processor 110 may calculate total mass of the vehicle based on only operation data obtained in a mode in which the vehicle automatically travels depending on a distance from a preceding vehicle and a predetermined speed.

For example, referring to Equation 1 above, a m×a component may have a large influence on accuracy in the process of calculating the total mass of the vehicle. Therefore, the processor 110 may use only operation data obtained in a state in which the vehicle drives at a certain speed to calculate total mass of the vehicle. For example, if the acceleration of the vehicle is "0", as the m×a component is also "0", the accuracy of the total mass of the vehicle calculated by the processor 110 may increase.

For example, the processor 110 may select an area where the acceleration is "0" in operation data obtained while the vehicle is traveling, thus improving the accuracy of estimating the total mass of the vehicle.

According to an embodiment, if the vehicle travels in a mode in which the vehicle automatically travels depending to the distance from the preceding vehicle and the predetermined speed, it may maintain a certain speed to travel. In this case, the processor 110 may calculate total mass of the vehicle based on operation data obtained in only a state in which the vehicle travels at the certain speed.

For example, the mode in which the vehicle automatically travels depending on the distance from the preceding vehicle and the predetermined speed may include a mode in which the cruise control function, the smart cruise control function, or the adaptive cruise control function operates.

According to an embodiment, the processor 110 may calculate total mass of the vehicle based on only operation data obtained in a specific condition including a state in which the vehicle is driven by only the motor, a state in which the vehicle does proceed with shift, or a state in which the vehicle automatically travels depending on the distance from the preceding vehicle and the predetermined speed.

For example, the processor 110 may calculate total mass of the vehicle based on only operation data obtained in a state in which all of a plurality of specific conditions are met. As another example, the processor 110 may calculate total mass of the vehicle based on only operation data obtained in a state in which only any one of the plurality of specific conditions is met.

According to an embodiment, the processor 110 may identify mass data of the vehicle, which includes the calculated total mass of the vehicle or the predetermined default mass. For example, the processor 110 may identify the total mass of the vehicle or the predetermined default mass as the mass data of the vehicle.

According to an embodiment, the processor 110 may calculate the ratio of the time when the vehicle travels in the HEV mode to the total driving time of the vehicle, based on a first layer model including a dynamic programming (DP) model and associated with global path planning and the mass data of the vehicle.

For example, a first layer may be referred to as an upper layer including the DP model and associated with the global plan planning.

For example, the DP model (or algorithm) may be one of global optimization techniques based on Bellman's Principle of Optimality.

According to an embodiment, the processor 110 may apply the mass data of the vehicle to the DP model to calculate the ratio of the time when the vehicle travels in the HEV mode to the total driving time of the vehicle.

According to an embodiment, the processor 110 may calculate at least one of the SOC of the battery of the vehicle, the load on the road in front of the vehicle, or any combination thereof, based on a second layer model including at least one of an acceleration prediction model, a vehicle required power model, a vehicle control model, or any combination thereof and associated with local path planning and the mass data of the vehicle.

For example, a second layer may be referred to as a lower layer including at least one of the vehicle required power model or the vehicle control model and associated with the local path planning.

For example, the acceleration prediction model may predict acceleration of the vehicle based on a relative position between the vehicle and another preceding vehicle or a relative speed of the other vehicle with respect to the vehicle, or operation data of the vehicle.

For example, the vehicle required power model may include an algorithm for predicting a required power value of the vehicle at a future time point when a specific time elapses from a current time point. As a detailed example, the vehicle required power model may predict the required power value of the vehicle at the future time point based on the operation data.

For example, the vehicle control model may calculate an optimal control amount using the predicted value calculated by means of the acceleration prediction model or the vehicle required power model and ratio information calculated in the first layer. For example, the ratio information may include information about the ratio of the time when the vehicle travels in the HEV mode to the total driving time of the vehicle. For example, the optimal control amount may be calculated based on an amount of fuel and an SOC.

According to an embodiment, the processor 110 may control the vehicle in the EV mode, depending on the calculated optimal control amount, or may control the vehicle in the HEV mode, depending on the calculated optimal control amount.

Figure 2:
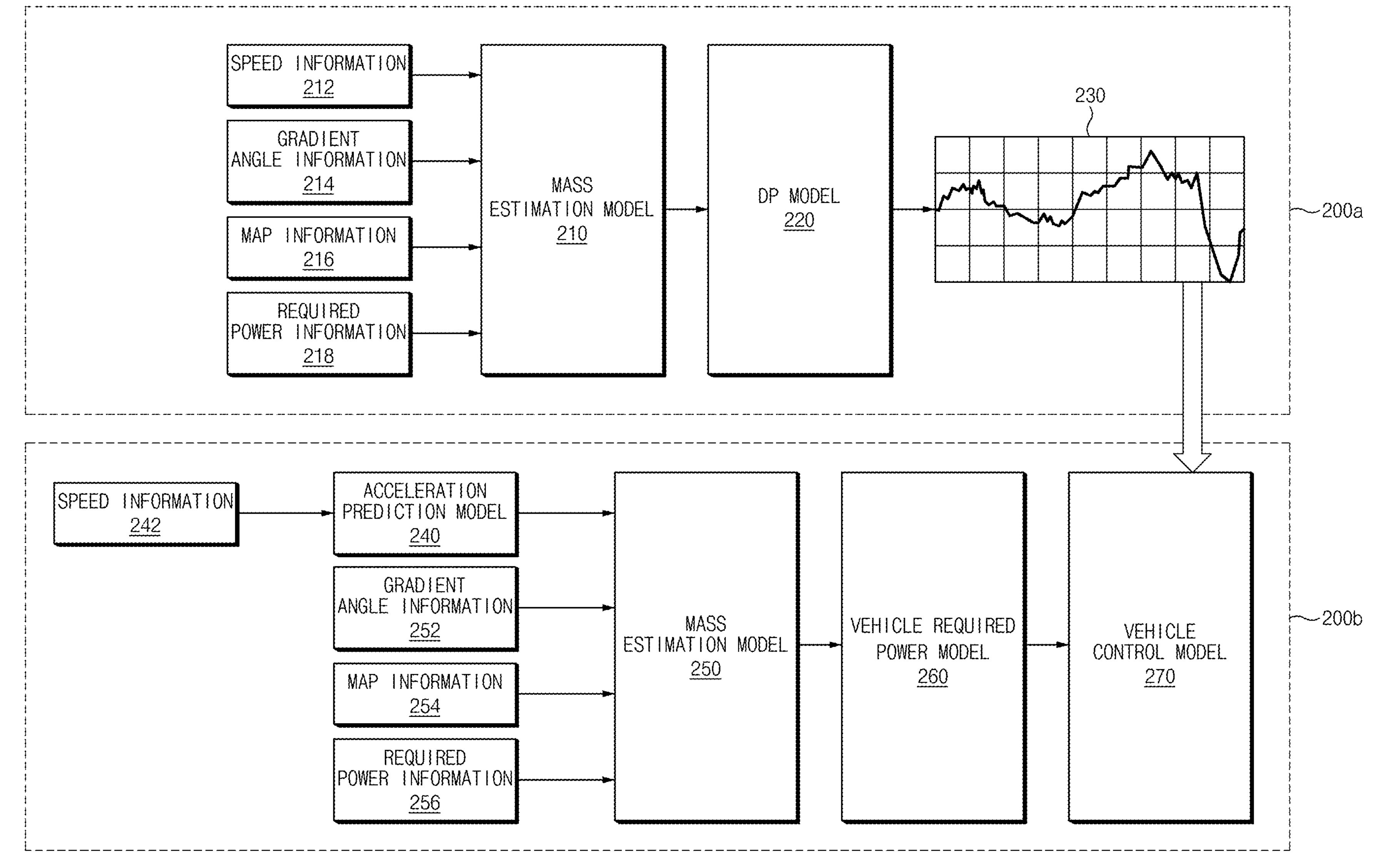
FIG. 2 is a block diagram illustrating an example in which a result calculated according to a mass estimation model of a vehicle control apparatus according to an embodiment of the present disclosure is applied to a DP model or a vehicle requirement power model.

FIG. 2 is a block diagram illustrating an example in which a result calculated according to a mass estimation model of a vehicle control apparatus according to an embodiment of the present disclosure is applied to a DP model or a vehicle requirement power model.

According to an embodiment, a first layer 200*a* may include at least one of a mass estimation model 210, a DP model 220, or any combination thereof. A second layer 200*b* may include at least one of an acceleration prediction model 240, a mass estimation model 250, a vehicle required power model 260, a vehicle control model 270, or any combination thereof.

For example, the first layer 200*a* may be referred to as an upper layer associated with global path planning.

For example, the second layer 200*b* may be referred to as a lower layer associated with local path planning.

According to an embodiment, the vehicle control apparatus may calculate total mass of a vehicle based on at least one of speed information 212, gradient angle information 214, map information 216, required power information 218, or any combination thereof and the mass estimation model 210 included in the first layer 200*a*.

According to an embodiment, the map information 216 may include at least one of grade information of the road ahead, a speed limit of the road ahead, traffic volume on the road ahead, or any combination thereof.

For example, the vehicle control apparatus may receive the map information 216 or navigation information from an external server via a communication circuit. The map information 216 may include information about a grade degree of the road, which is included in three-dimensional (3D) map data, information about a speed limit, or information about a traffic speed, which is included in transport protocol expert group (TPEG) data.

According to an embodiment, the vehicle control apparatus may obtain ratio information 230 based on total mass of the vehicle, which is calculated by means of the mass estimation model 210 included in the first layer 200*a*, and the DP model 220.

For example, the ratio information 230 may include ratio information about a partial route in which the vehicle is located among a plurality of partial routes. In detail, the ratio information 230 may include information about a ratio of a time when the vehicle travels in an HEV model to a total driving time of the vehicle or SOC information.

According to an embodiment, the vehicle control apparatus may obtain acceleration information of the vehicle based on the speed information 242 and the acceleration prediction model 240.

According to an embodiment, the vehicle control apparatus may calculate total mass of the vehicle based on at least one of the acceleration information, the gradient angle information 252, the map information 254, the required power information 256, or any combination thereof and the mass estimation model 250 included in the second layer 200*b*.

According to an embodiment, the map information 254 may include at least one of grade information of the road ahead, a speed limit of the road ahead, traffic volume on the road ahead, or any combination thereof.

According to an embodiment, the vehicle control apparatus may obtain data associated with required power of the vehicle based on total mass of the vehicle, which is calculated by means of the mass estimation model 250 included in the second layer 200*b*, and the vehicle required power model 260. For example, the data associated with the required power of the vehicle may include data about at least one of a predicted speed of the vehicle that is required on the road ahead, predicted power of the vehicle that is required on the road ahead, a load on the road in front of the vehicle, or any combination thereof.

According to an embodiment, the vehicle control apparatus may identify pieces of information obtained by means of the first layer 200*a* or the second layer 200*b* as predicted data.

For example, the predicted data may include at least one of a ratio of a time when the vehicle travels in an HEV mode to a total driving time of the vehicle, an SOC of the battery of the vehicle, a load on the road in front of the vehicle, a predicted speed of the vehicle that is required on the road in front of the vehicle, predicted power of the vehicle that is required on the road in front of the vehicle, or any combination thereof.

According to an embodiment, the vehicle control apparatus may calculate an optimal control amount based on the predicted data and the vehicle control model 270. For example, the optimal control amount may be calculated based on an amount of fuel and an SOC.

According to an embodiment, the vehicle control apparatus may control the vehicle in the EV mode based on the calculated optimal control amount, or may control the vehicle in the HEV mode based on the calculated optimal control amount.

Referring to FIG. 2 according to an embodiment, the vehicle control apparatus may improve fuel efficiency or fuel economy based on the result calculated by means of the model included in the first layer 200*a* and the model included in the second layer 200*b*.

Figure 3:
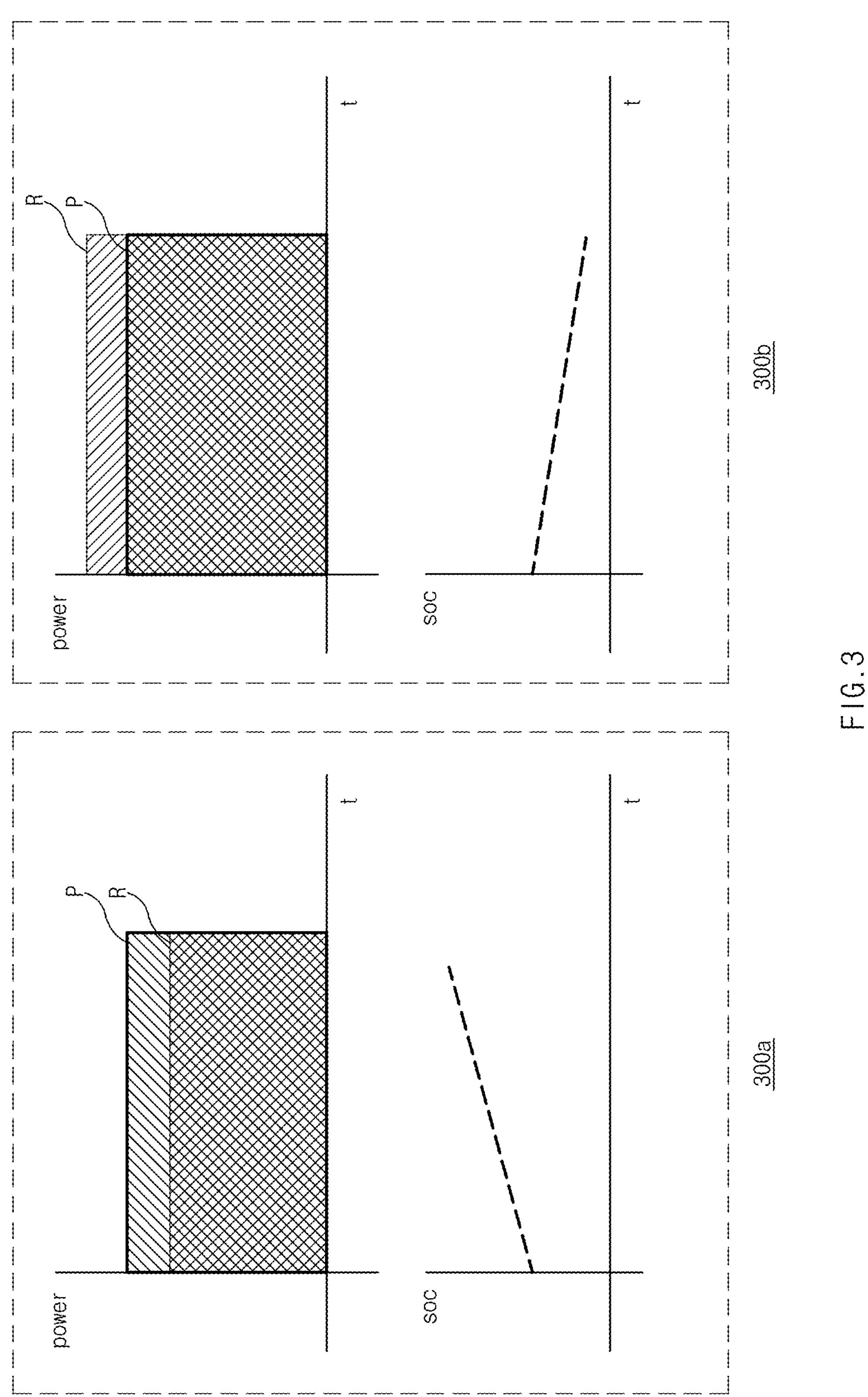
FIG. 3 is a drawing illustrating an example in which flow of an SOC is differently predicted as total mass of a vehicle is differently calculated, in a vehicle control apparatus according to an embodiment of the present disclosure.

FIG. 3 is a drawing illustrating an example in which flow of an SOC is differently predicted as total mass of a vehicle is differently calculated, in a vehicle control apparatus according to an embodiment of the present disclosure.

Referring to FIG. 3, according to an embodiment, graphs 300*a* and 300*b* illustrate power over time and SOCs over time. The graph for power over time illustrates an example in which a gradient load R may be differently calculated according to the magnitude of total mass of a vehicle. For example, the magnitude of the gradient load R may be proportional to the magnitude of the total mass of the vehicle.

According to an embodiment, there may be no need to drive a motor if the gradient load R is smaller than engine power P. On the other hand, there may be a need to drive the motor if the gradient load R is greater than the engine power P.

The graphs 300*a* according to an embodiment illustrate an example in which total mass of the vehicle is calculated to be small.

For example, if the total mass of the vehicle is calculated to be small, the gradient load R may be predicted to be smaller than the engine power P. In this case, because the vehicle is able to output a force of the gradient load R or more using only the engine power P, there may be no need to drive the motor. Because the motor is not driven, the SOC of the battery of the vehicle may increase.

The graphs 300*b* according to an embodiment illustrates an example in which the total mass of the vehicle is calculated to be large (e.g., greater than a threshold).

For example, if the total mass of the vehicle is calculated to be large, the gradient load R may be predicted to be greater than the engine power P. In this case, because the vehicle is unable to output the force of the gradient load R or more using only the engine power P, there may be the need to drive the motor. Because the motor is driven, the SOC of the battery of the vehicle may decrease.

Referring to FIG. 3 according to an embodiment, the gradient load R may be determined according to the total mass of the vehicle. Because flow of the SOC of the battery can be differently predicted according to the calculated total mass of the vehicle, there is a need to accurately calculate the total mass.

Figure 4:
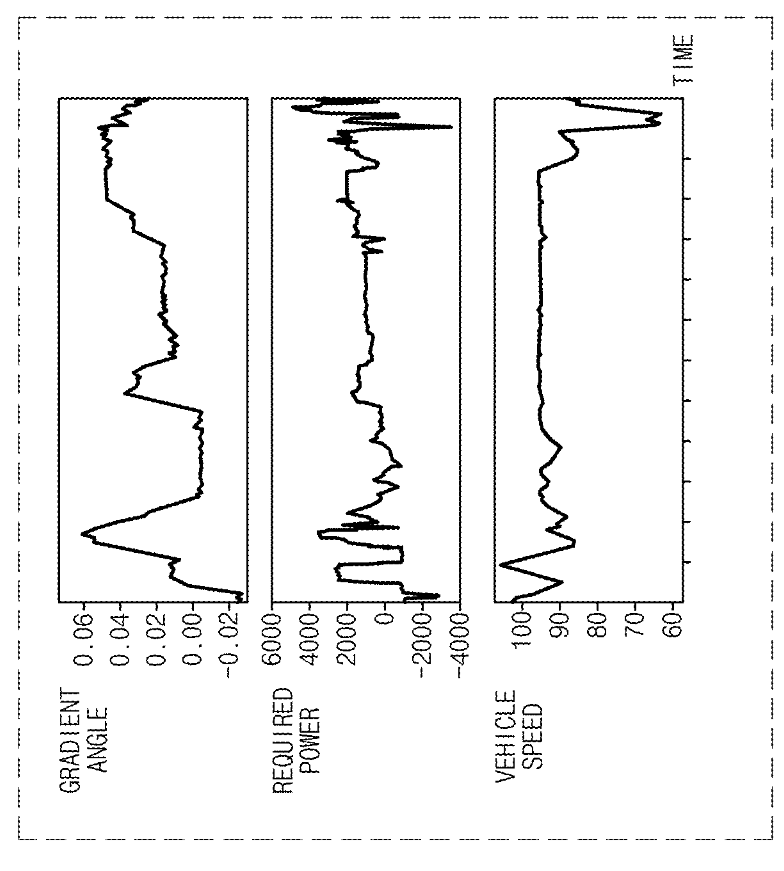
FIG. 4 is a drawing illustrating an example of a correlation among a speed of a vehicle, a gradient angle, and required power, in a vehicle control apparatus according to an embodiment of the present disclosure.
Figure 4:
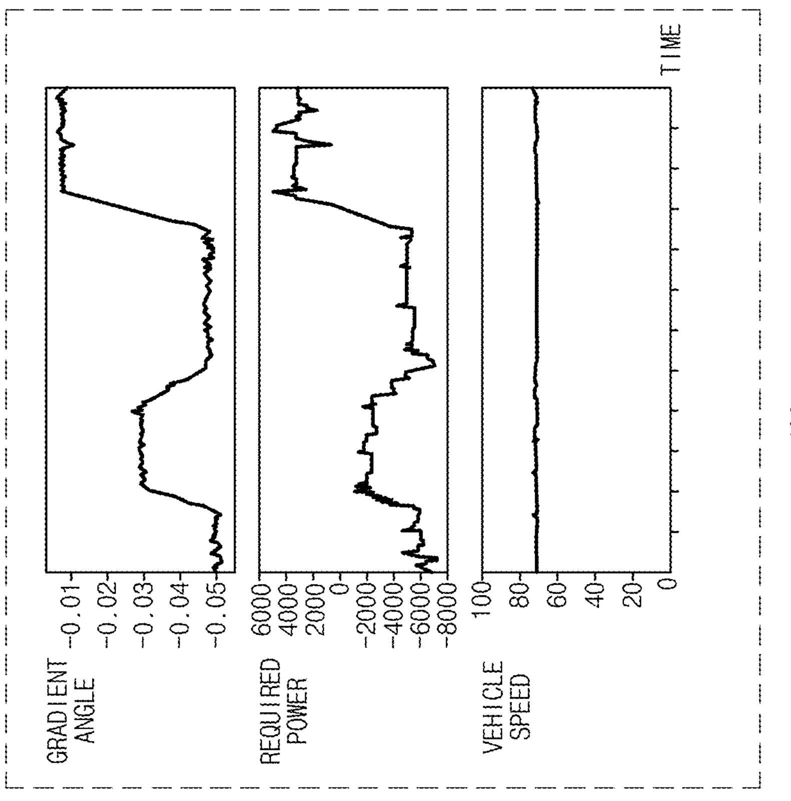

FIG. 4 is a drawing illustrating an example of a correlation among a speed of a vehicle, a gradient angle, and required power, in a vehicle control apparatus according to an embodiment of the present disclosure.

According to an embodiment, graphs 400*a*, 400*b* illustrate a gradient angle of a road on which the vehicle travels, a speed of the vehicle which travels on the road at the gradient angle, and power of the vehicle required for the vehicle to travel on the road at the gradient angle.

Referring to the graphs 400*a*, according to an embodiment, if the speed of the vehicle is constant, a correlation between the gradient angle and the required power may be relatively large. The correlation may refer to a function relationship in which any one statistical variable and several other statistical variables covary. For example, if the speed of the vehicle is constant, as the gradient angle is large, the correlation may be a correlation with relatively large required power.

Referring to the graphs 400*b* according to an embodiment, if the speed of the vehicle is not constant, the correlation between the gradient angle and the required power may be relatively small. For example, if the speed of the vehicle is not constant, the required power may be large even if the gradient angle is small.

According to FIG. 4, according to an embodiment, it may be identified that the gradient angle and the required power show a high correlation in only an area where the speed of the vehicle is kept constant.

Figure 5:
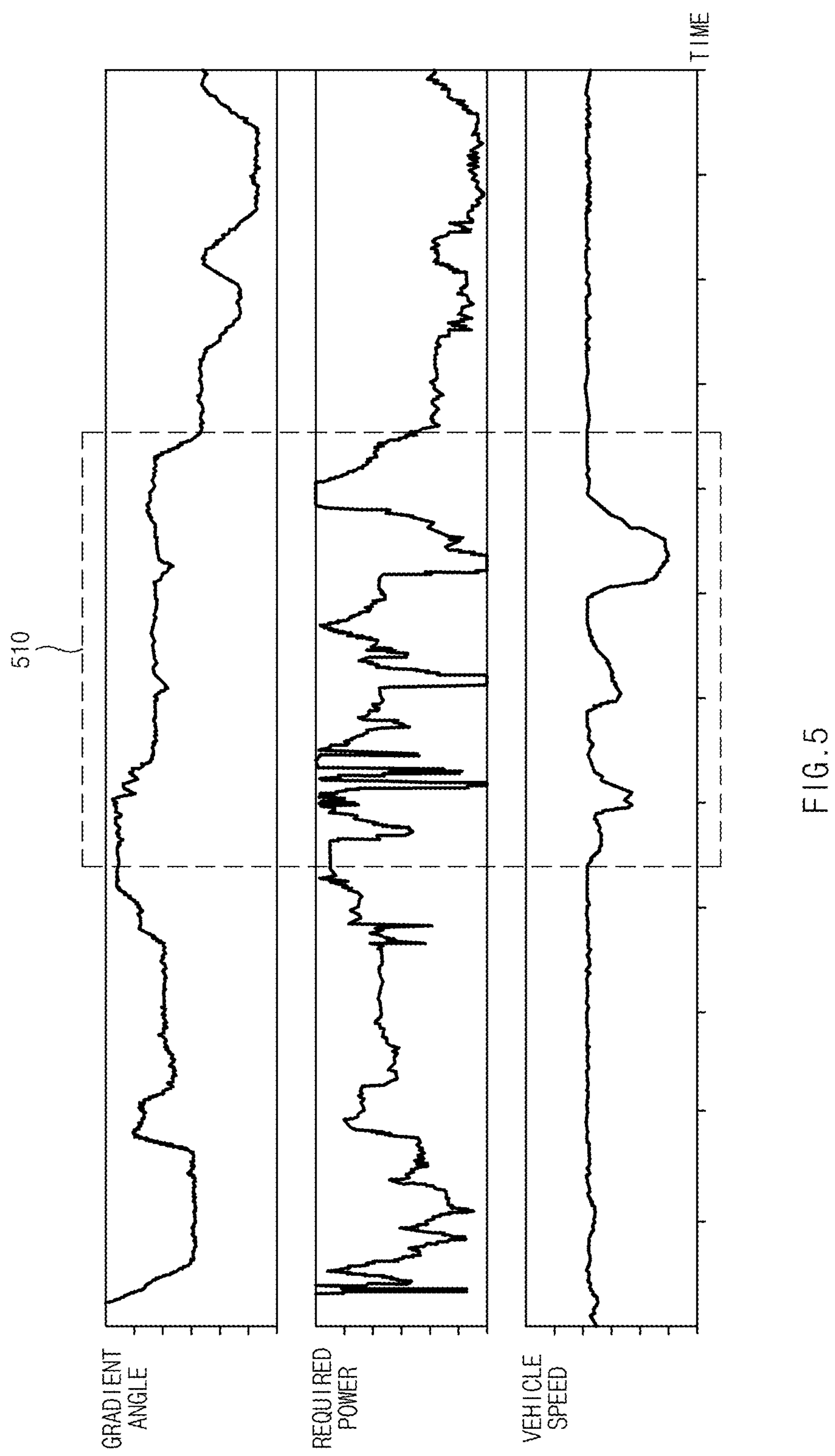
FIG. 5 is a drawing illustrating an example in which data sampling is performed only for an area where a speed of a vehicle is kept constant, in a vehicle control apparatus according to an embodiment of the present disclosure.

FIG. 5 is a drawing illustrating an example in which data sampling is performed only for an area where a speed of a vehicle is kept constant, in a vehicle control apparatus according to an embodiment of the present disclosure.

As described above with reference to FIG. 4, the gradient angle and the required power may show the high correlation in only the area where the speed of the vehicle is kept constant.

Thus, the vehicle control apparatus may calculate total mass of a vehicle based on only operation data obtained if the speed of the vehicle is constant. For example, the vehicle control apparatus may perform sampling excluding operation data obtained in an area 510 where the speed of the vehicle is not constant.

According to an embodiment, the vehicle control apparatus may determine an area where the speed of the vehicle is constant based on whether a change in the speed of the vehicle is maintained within an error range.

For example, the vehicle control apparatus may perform sampling excluding operation data obtained in an area where the change in the speed of the vehicle is outside the predetermined error range.

Figure 6:
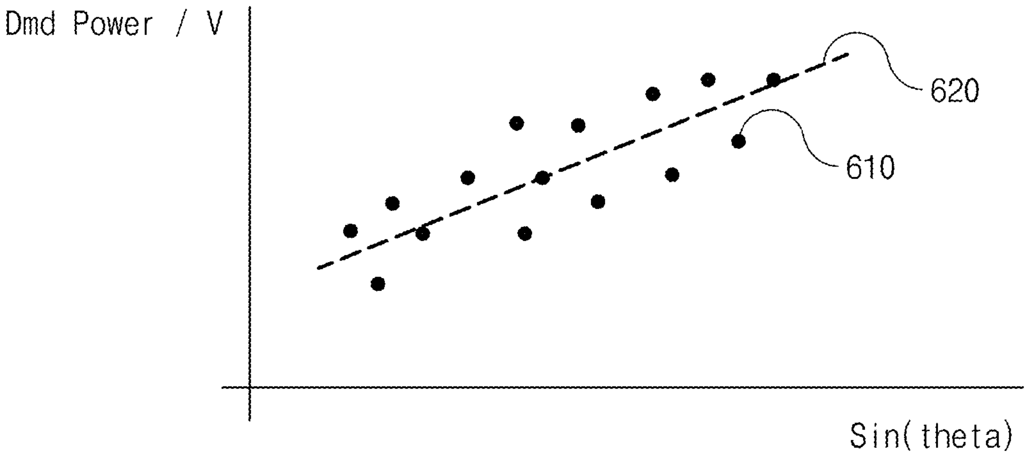
FIG. 6 is a graph illustrating an example of a data trend line derived to calculate total mass of a vehicle, in a vehicle control apparatus according to an embodiment of the present disclosure.

FIG. 6 is a graph illustrating an example of a data trend line derived to calculate total mass of a vehicle, in a vehicle control apparatus according to an embodiment of the present disclosure.

According to an embodiment, the vehicle control apparatus may derive a data trend line 620 based on operation data 610 to calculate total mass of the vehicle.

According to an embodiment, the operation data obtained by the vehicle control apparatus may include several types of pieces of operation data. For example, the vehicle control apparatus may obtain operation data for a required power value of the vehicle, a speed of the vehicle, transmission efficiency, and/or a gradient angle.

According to an embodiment, the vehicle control apparatus may derive the data trend line 620, based on operation data 610 for any one of the required power value of the vehicle, the speed of the vehicle, the transmission efficiency, and/or the gradient angle.

According to an embodiment, the vehicle control apparatus may derive the data trend line 620, based on linear least square (LSQ) for minimizing an error between data and a trend line and finding an optimal trend line. In more detail, the trend line may be derived as a straight line in which the sum of squares of (a measured value–a function value) is minimized.

According to an embodiment, the vehicle control apparatus may derive the data trend line 620 based on the operation data 610 derived on a graph of "required power/speed Dmd Power/v" for a "gradient angle sin(θ)".

According to an embodiment, the vehicle control apparatus may calculate a slope value of the derived data trend line 620.

According to an embodiment, as described above with reference to FIG. 1, the vehicle control apparatus may calculate the total mass of the vehicle based on the at least one of the slope value of the data trend line or the transmission efficiency, or any combination thereof.

FIG. 7 is a drawing illustrating an example of map data of transmission efficiency used to calculate total mass of a vehicle, in a vehicle control apparatus according to an embodiment of the present disclosure.

FIG. 7 illustrates map data for transmission efficiency according to shift revolutions per minute (RPM) and transmission input torque, according to an embodiment.

According to an embodiment, the vehicle control apparatus may calculate total mass of the vehicle based on operation data including transmission efficiency. The transmission efficiency may be replaced with a shift efficiency value determined according to shift RPM and transmission input torque.

Referring to FIG. 7, according to an embodiment, if the shift RPM is 2000 and the transmission input torque is 60, the transmission efficiency value may be obtained as 90.

According to an embodiment, the vehicle control apparatus may obtain the shift efficiency value according to the shift RPM and the transmission input torque in the form of map data. For example, the map data for the shift efficiency value may be stored in a memory and may be received from an external server.

According to an embodiment, the vehicle control apparatus may calculate total mass of the vehicle using a shift efficiency value according to shift RPM and transmission input torque of the vehicle, which are measured in real time.

Data values displayed in FIG. 7 are merely an example. The values may be calculated as other values in other embodiments.

Hereinafter, a vehicle control method according to an embodiment of the present disclosure is described in more detail below with reference to FIGS. 8 and 9.

Hereinafter, it is assumed that the vehicle control apparatus 100 of FIG. 1 performs processes of FIGS. 8 and 9. Furthermore, in descriptions of FIGS. 8 and 9, an operation described as being performed by a processor may be understood as being controlled by the processor 110 of the vehicle control apparatus 100.

Figure 8:
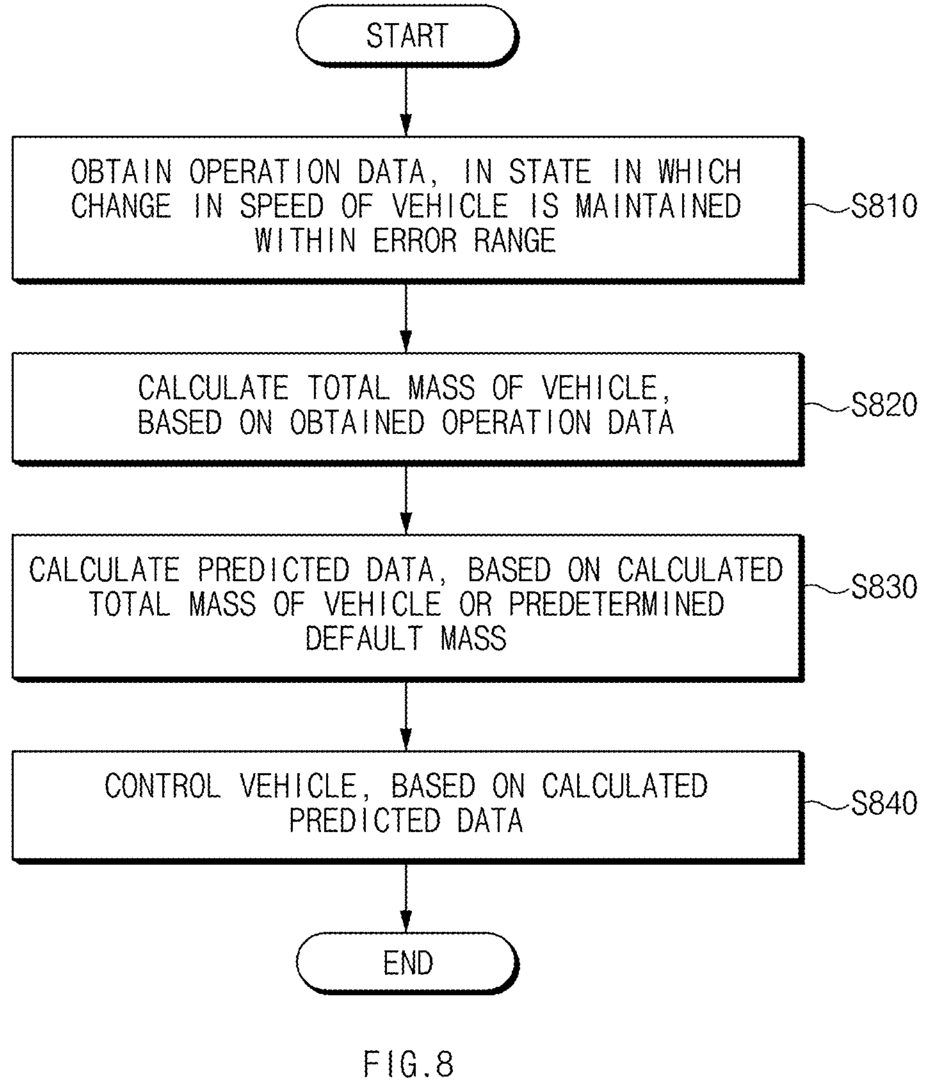
FIG. 8 is a flowchart of a vehicle control method, according to an embodiment of the present disclosure.

FIG. 8 is a flowchart of a vehicle control method, according to an embodiment of the present disclosure.

In an operation S810, a processor may obtain operation data in a state in which a change in speed of a vehicle is maintained within an error range. For example, the operation data may include at least one of a required power value of the vehicle, a speed of the vehicle, transmission efficiency, a gradient angle, or any combination thereof.

In an operation S820, the processor may calculate total mass of the vehicle based on the obtained operation data. For example, the total mass of the vehicle may include at least one of tolerance mass of the vehicle, mass of a passenger who rides in the vehicle, mass of an object loaded into the vehicle, mass of fuel of the vehicle, or any combination thereof.

In an operation S830, the processor may calculate predicted data based on the calculated total mass of the vehicle or predetermined default mass. For example, the default mass may include a mass value set regardless of a driving environment of the vehicle or driving habits of the driver. For example, the predicted data may include at least one of a ratio of a time when the vehicle travels in a hybrid electric mode (HEV) mode to a total driving time of the vehicle, a state of charge (SOC) of a battery of the vehicle, a load on a road in front of the vehicle, or any combination thereof.

In an operation S840, the processor may control the vehicle based on the calculated predicted data. For example, the processor may control the vehicle in an electric vehicle (EV) mode based on the predicted data, or may control the vehicle in a hybrid electric vehicle (HEV) mode based on the predicted data.

Figure 9:
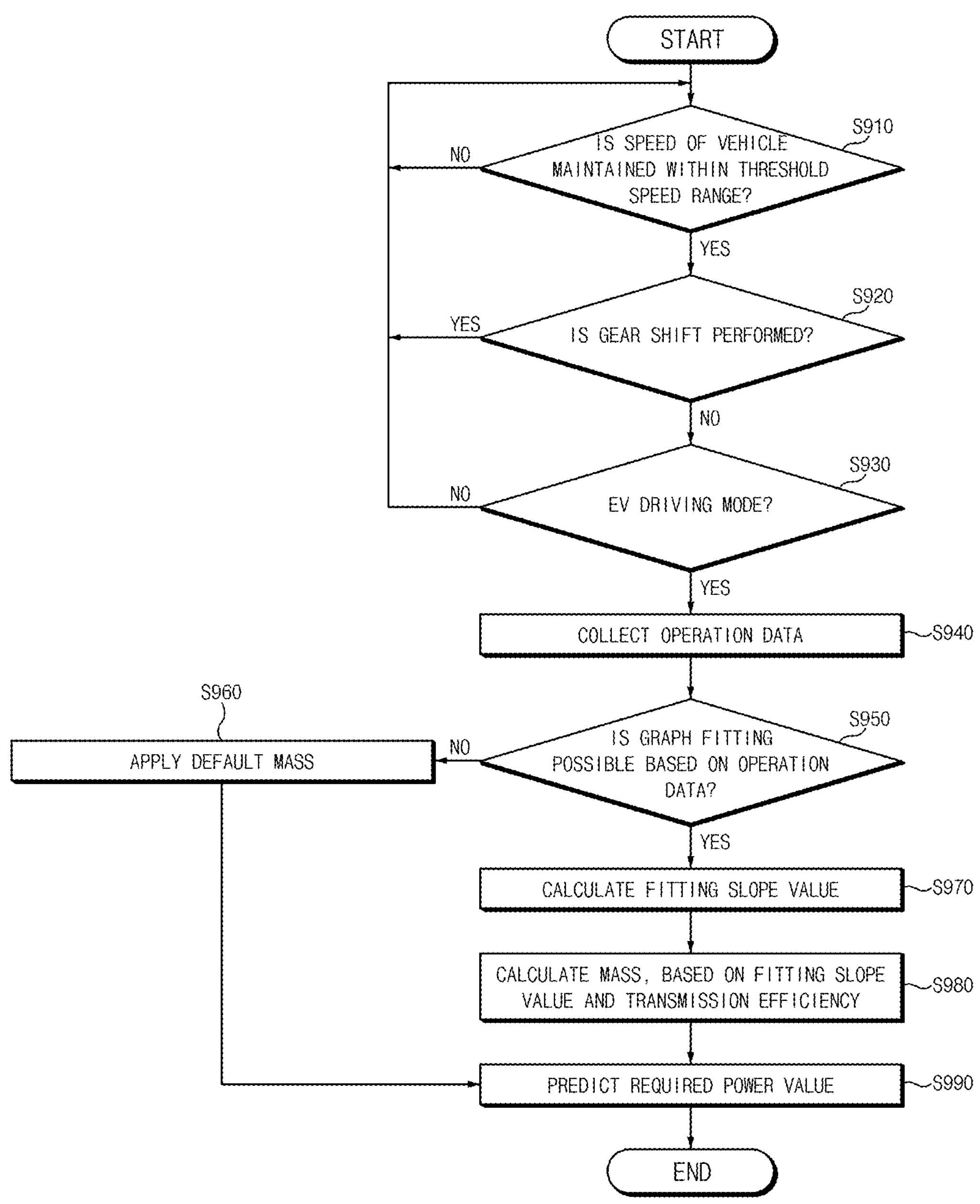
FIG. 9 is a flowchart of a method for calculating total mass of a vehicle based on operation data according to a specific condition, according to an embodiment of the present disclosure.

FIG. 9 is a flowchart for of a method for calculating total mass of a vehicle based on operation data according to a specific condition, according to an embodiment of the present disclosure.

According to an embodiment, operations S910-S930 may be included in a specific condition for obtaining operation data necessary for a processor to calculate total mass of a vehicle.

In an operation S910, the processor may determine whether a speed of the vehicle is maintained within a threshold speed range. For example, the processor may determine whether the vehicle travels at a constant speed. Because a correlation between a gradient angle and required power may be high in an area where the speed of the vehicle is kept constant, the processor may collect only operation data obtained in the state in which the speed of the vehicle is constant.

Thus, whether the speed of the vehicle is within the threshold speed may be determined to be the same as whether the change in the speed of the vehicle (e.g., the vehicle described above with reference to FIG. 1) is maintained with an error range. For example, the state in which the change in the speed of the vehicle is maintained within the error range may include a state in which the vehicle travels at a constant speed during a specific time or more.

In an operation S920, the processor may determine whether the vehicle performs shift. For example, the processor may calculate total mass of the vehicle based on only operation data obtained in a state in which the vehicle does not proceed with shift.

In an operation S930, the processor may determine whether the vehicle is traveling in an electric vehicle (EV) driving mode. For example, the processor may calculate total mass of the vehicle based on only operation data obtained in a state in which the vehicle is driven by only the motor. For example, the processor may collect operation data in only a state in which the vehicle is driven by the motor in which the accuracy of torque is able be greater than the engine.

In an operation S940, the processor may collect operation data in a state in which all the conditions in the operations S910-S930 are met. However, this is merely an example. As another example, the processor may collect operation data in a state in which only any one of the conditions in operations S910-S930 is met.

In an operation S950, the processor may determine whether graph fitting is possible based on the operation data. For example, the graph fitting may refer to deriving a data trend line based on operation data. For example, the processor may derive the data trend line of the operation data using a linear least square (LSQ).

According to an embodiment, if the graph fitting is impossible based on the operation data, in an operation S960, the processor may apply default mass. The default mass may include a mass value set regardless of a driving environment of the vehicle or driving habits of the driver.

According to an embodiment, if the graph fitting is possible based on the operation data, in an operation S970, the processor may calculate a fitting slope value. For example, the processor may calculate a slope value of the derived data trend line.

In an operation S980, the processor may calculate total mass of the vehicle based on the fitting slope value and transmission efficiency. For example, the processor may calculate the slope value of the data trend line, based on the total mass of the vehicle, gravitational acceleration, and the transmission efficiency.

In an operation S990, the processor may calculate a required power value based on the calculated total mass of the vehicle or predetermined default mass.

In addition, the processor may predict a ratio of a time when the vehicle travels in a hybrid electric vehicle (HEV) mode to a total driving time of the vehicle, a state of charge (SOC) of the battery of the vehicle, or a load on a road in front of the vehicle, based on the calculated total mass of the vehicle or the predetermined default mass.

According to an embodiment, the processor may control the vehicle based on the predicted data. For example, the processor may control the vehicle in the EV mode based on the predicted data, or may control the vehicle in the HEV mode based on the predicted data.

Figure 10:
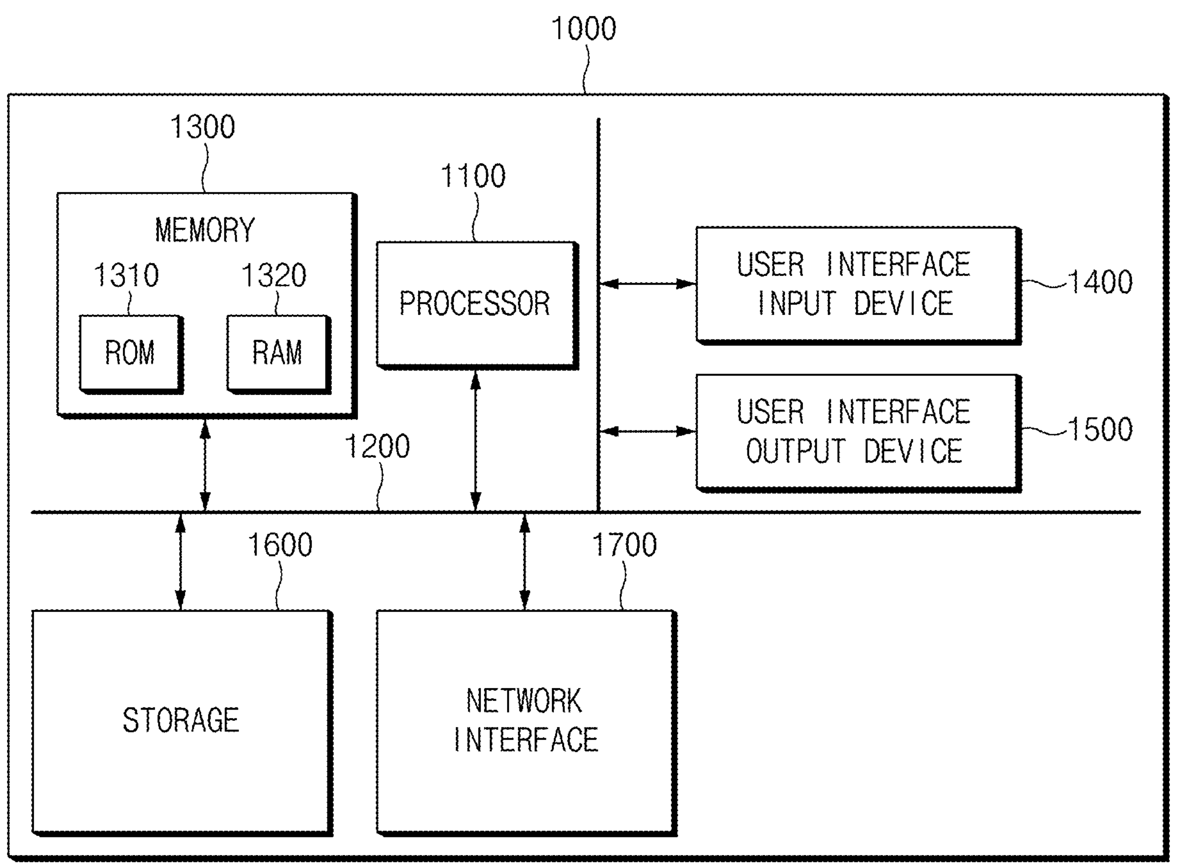
FIG. 10 illustrates a computing system associated with a vehicle control apparatus or a vehicle control method according to an embodiment of the present disclosure.

FIG. 10 illustrates a computing system associated with a vehicle control apparatus or a vehicle control method according to an embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments of the present disclosure may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another embodiment, the processor and the storage medium may reside in the user terminal as separate components.

Embodiment of the present disclosure may improve the accuracy of calculating total mass of the vehicle traveling, by means of a data trend line based on operation data.

Furthermore, embodiments of the present disclosure may improve the accuracy of predicting a driving load using the calculated total mass of the vehicle.

Furthermore, embodiments of the present disclosure may efficiently manage a state of charge (SOC) of the battery based on the driving load predicted using the total mass of the vehicle.

Furthermore, embodiments of the present disclosure may efficiently control the vehicle based on the driving load predicted using the total mass of the vehicle.

In addition, various effects ascertained directly or indirectly through the present disclosure may be provided.

Hereinabove, although the present disclosure has been described with reference to some embodiments and the accompanying drawings, the present disclosure is not limited thereto, but may be variously modified and altered by those having ordinary skill in the art to which the present disclosure pertains without departing from the spirit and scope of the present disclosure claimed in the following claims.

Therefore, the described embodiments of the present disclosure are not intended to limit the technical spirit of the present disclosure. Rather, the embodiments are provided only for illustrative purposes. The scope of the present disclosure should be construed on the basis of the accompanying claims, and all the technical ideas within the scope equivalent to the claims should be included in the scope of the present disclosure.

What is claimed is:

1. A vehicle control apparatus, comprising:
a memory storing a program instruction; and
a processor configured to execute the program instruction, wherein the processor is configured to:
obtain operation data including at least one of a required power value of a vehicle, a speed of the vehicle, transmission efficiency, a gradient angle, or any combination thereof, in a state in which a change in the speed of the vehicle is maintained within an error range;
calculate total mass of the vehicle, the total mass including at least one of tolerance mass of the vehicle, mass of a passenger who rides in the vehicle, mass of an object loaded into the vehicle, mass of fuel of the vehicle, or any combination thereof, based on the operation data, wherein the processor is configured to calculate the total mass of the vehicle based on only the operation data obtained in a state in which the vehicle does not proceed with shift;
calculate predicted data including at least one of a ratio of a time when the vehicle travels in a hybrid electric vehicle (HEV) mode to a total driving time of the vehicle, a state of charge (SOC) of a battery of the vehicle, a load on a road in front of the vehicle, or any combination thereof, based on the calculated total mass of the vehicle or predetermined default mass; and
control the vehicle based on the predicted data.

2. The vehicle control apparatus of claim 1, wherein the processor is configured to:
derive a data trend line based on the operation data;
calculate a slope value of the data trend line; and
calculate the total mass of the vehicle based on at least one of the slope value of the data trend line, the transmission efficiency, or any combination thereof.

3. The vehicle control apparatus of claim 2, wherein the processor is configured to derive the data trend line using a linear least square (LSQ).

4. The vehicle control apparatus of claim 1, wherein the processor is configured to calculate the predicted data based on the predetermined default mass when the processor is unable to derive a data trend line based on the operation data.

5. The vehicle control apparatus of claim 1, wherein the processor is configured to obtain the transmission efficiency based on map data including a transmission efficiency value determined according to revolutions per minute (RPM) of the vehicle and input torque of the vehicle.

6. The vehicle control apparatus of claim 1, wherein the processor is configured to calculate the total mass of the vehicle based on only the operation data obtained in a state in which the vehicle is driven by a motor.

7. The vehicle control apparatus of claim 1, wherein the processor is configured to calculate the total mass of the vehicle based on only the operation data obtained in a mode in which the vehicle travels depending on a distance from a preceding vehicle and a predetermined speed.

8. The vehicle control apparatus of claim 1, wherein the processor is configured to:
identify mass data of the vehicle, the mass data including the calculated total mass of the vehicle or the predetermined default mass;
calculate the ratio of the time when the vehicle travels in the HEV mode to the total driving time of the vehicle, based on a first layer model including a dynamic programming model and associated with global path planning and the mass data of the vehicle; or
calculate at least one of the SOC of the battery of the vehicle, the load on the road in front of the vehicle, or any combination thereof, based on a second layer model including at least one of an acceleration prediction model, a vehicle required power model, a vehicle control model, or any combination thereof and associated with local path planning and the mass data of the vehicle.

9. The vehicle control apparatus of claim 1, wherein the processor is configured to control the vehicle in an electric vehicle (EV) mode, based on the predicted data, or control the vehicle in the hybrid electric vehicle (HEV) mode, based on the predicted data.

10. A vehicle control method, comprising:
obtaining, by a processor, operation data including at least one of a required power value of a vehicle, a speed of the vehicle, transmission efficiency, a gradient angle, or any combination thereof, in a state in which a change in the speed of the vehicle is maintained within an error range;
calculating, by the processor, total mass of the vehicle including at least one of tolerance mass of the vehicle, mass of a passenger who rides in the vehicle, mass of an object loaded into the vehicle, mass of fuel of the vehicle, or any combination thereof, based on the operation data, wherein calculating the total mass of the vehicle includes calculating, by the processor, the total mass of the vehicle based on only the operation data obtained in a state in which the vehicle does not proceed with shift;
calculating, by the processor, predicted data including at least one of a ratio of a time when the vehicle travels in a hybrid electric vehicle (HEV) mode to a total driving time of the vehicle, a state of charge (SOC) of a battery of the vehicle, a load on a road in front of the vehicle, or any combination thereof, based on the calculated total mass of the vehicle or predetermined default mass; and
controlling, by the processor, the vehicle based on the predicted data.

11. The vehicle control method of claim 10, wherein calculating of the total mass of the vehicle includes:
deriving, by the processor, a data trend line based on the operation data;
calculating, by the processor, a slope value of the data trend line; and
calculating, by the processor, the total mass of the vehicle based on at least one of the slope value of the data trend line, the transmission efficiency, or any combination thereof.

12. The vehicle control method of claim 11, wherein deriving the data trend line based on the operation data by the processor includes deriving, by the processor, the data trend line using a line using a linear least square (LSQ).

13. The vehicle control method of claim 10, wherein calculating the predicted data includes calculating, by the processor, the predicted data based on the predetermined default mass when the processor is unable to derive a data trend line based on the operation data.

14. The vehicle control method of claim 10, wherein obtaining the operation data includes obtaining, by the processor, the transmission efficiency based on map data including a transmission efficiency value determined according to revolutions per minute (RPM) of the vehicle and input torque of the vehicle.

15. The vehicle control method of claim 10, wherein calculating the total mass of the vehicle includes:

calculating, by the processor, the total mass of the vehicle based on only the operation data obtained in a state in which the vehicle is driven by a motor.

16. The vehicle control method of claim 10, wherein calculating the total mass of the vehicle includes calculating, by the processor, the total mass of the vehicle based on only the operation data obtained in a mode in which the vehicle travels depending on a distance from a preceding vehicle and a predetermined speed.

17. The vehicle control method of claim 10, wherein calculating the predicted data includes one or both of:

identifying, by the processor, mass data of the vehicle, the mass data including the calculated total mass of the vehicle or the predetermined default mass, and calculating, by the processor, the ratio of the time when the vehicle travels in the HEV mode to the total driving time of the vehicle, based on a first layer model including a dynamic programming model and associated with global path planning and the mass data of the vehicle; or identifying, by the processor, the mass data of the vehicle, the mass data including the calculated total mass of the vehicle or the predetermined default mass, and calculating, by the processor, at least one of the SOC of the battery of the vehicle, the load on the road in front of the vehicle, or any combination thereof, based on a second layer model including at least one of an acceleration prediction model, a vehicle required power model, a vehicle control model, or any combination thereof and associated with local path planning and the mass data of the vehicle.

18. The vehicle control method of claim 10, wherein controlling the vehicle based on the predicted signal includes one of:

controlling, by the processor, the vehicle in an electric vehicle (EV) mode based on the predicted data; or controlling, by the processor, the vehicle in the hybrid electric vehicle (HEV) mode based on the predicted data.

* * * * *